(12) United States Patent
Cracknell

(10) Patent No.: US 7,757,676 B2
(45) Date of Patent: *Jul. 20, 2010

(54) REFORMING OF GTL FOR MARINE APPLICATIONS

(75) Inventor: Roger Francis Cracknell, Chester (GB)

(73) Assignee: Shell Oil Company, Houston, TX (US)

( * ) Notice: Subject to any disclaimer, the term of this patent is extended or adjusted under 35 U.S.C. 154(b) by 220 days.

This patent is subject to a terminal disclaimer.

(21) Appl. No.: 11/885,371

(22) PCT Filed: Feb. 28, 2006

(86) PCT No.: PCT/EP2006/060319

§ 371 (c)(1),
(2), (4) Date: Aug. 30, 2007

(87) PCT Pub. No.: WO2006/092392

PCT Pub. Date: Sep. 8, 2006

(65) Prior Publication Data

US 2008/0190100 A1  Aug. 14, 2008

(30) Foreign Application Priority Data

Mar. 1, 2005  (EP) ................................. 05251213

(51) Int. Cl.
- F02M 25/07 (2006.01)
- F02B 47/08 (2006.01)
- F01N 3/20 (2006.01)
- B63B 38/00 (2006.01)
- C01B 3/26 (2006.01)

(52) U.S. Cl. ................ 123/568.11; 60/286; 123/3; 114/39.21; 423/651

(58) Field of Classification Search ............... 123/3, 123/304, 431, 568.11, 568.15, 575; 60/274, 60/278, 279, 286, 297, 303; 440/113; 423/648.1, 423/651; 114/39.21

See application file for complete search history.

(56) References Cited

U.S. PATENT DOCUMENTS

| 4,125,566 | A | 11/1978 | Trin Dinh et al. ............ 260/676 |
| 4,478,955 | A | 10/1984 | Pesa et al. .................... 518/713 |
| 5,412,946 | A | 5/1995 | Oshima et al. ................ 60/286 |
| 5,473,887 | A | 12/1995 | Takeshima et al. ............ 60/276 |
| 5,874,057 | A | 2/1999 | Deeba et al. ............. 423/239.1 |
| 6,749,829 | B2 * | 6/2004 | Briscoe ...................... 423/651 |
| 7,213,567 | B2 * | 5/2007 | Cracknell ................... 123/304 |

(Continued)

FOREIGN PATENT DOCUMENTS

EP  147873  7/1985

(Continued)

*Primary Examiner*—Willis R Wolfe, Jr.

(57) ABSTRACT

A process for operating a marine engine (1) in combination with a catalytic partial oxidation reformer (2) and, optionally, an exhaust gas aftertreater (3), wherein: (a) a mixture of a first fuel and air, is introduced in the combustion chamber of the engine (1); (b) exhaust gas is discharged from the engine and optionally partly recirculated to the combustion chamber of the engine (1); (c) a second fuel and oxygen and/or steam are supplied to the catalytic partial oxidation reformer (2) to produce synthesis gas, wherein the second fuel comprises Fischer-Tropsch derived fuel; (d) at least part of the synthesis gas is supplied to: (i) the exhaust gas aftertreater (3); (ii) the combustion chamber of the engine (1); or to both.

19 Claims, 2 Drawing Sheets

U.S. PATENT DOCUMENTS

| | | | |
|---|---|---|---|
| 7,455,704 B2 * | 11/2008 | Garwood | 44/589 |
| 2002/0090868 A1 * | 7/2002 | Schmitman | 440/113 |
| 2002/0194835 A1 | 12/2002 | Bromberg et al. | 60/275 |
| 2003/0115857 A1 | 6/2003 | Preis et al. | 60/286 |
| 2003/0168263 A1 | 9/2003 | Botti et al. | 180/65.1 |
| 2004/0136901 A1 * | 7/2004 | Bakker et al. | 423/648.1 |
| 2008/0190100 A1 * | 8/2008 | Cracknell | 60/303 |
| 2009/0031968 A1 * | 2/2009 | Cracknell et al. | 123/3 |

FOREIGN PATENT DOCUMENTS

| | | |
|---|---|---|
| EP | 583836 | 2/1994 |
| EP | 1030395 | 8/2000 |
| FR | 2801603 | 1/2001 |
| GB | 2077289 | 12/1981 |
| GB | 2320057 | 6/1998 |
| WO | WO9919249 | 4/1999 |
| WO | WO0134950 | 5/2001 |
| WO | WO2005054657 | 6/2005 |

* cited by examiner

REFORMING OF GTL FOR MARINE APPLICATIONS

PRIORITY CLAIM

The present application claims priority to European Patent Application 05251213.4 filed 1 Mar. 2005.

FIELD OF THE INVENTION

The present invention relates to a process for operating a marine vessel in conjunction with a catalytic partial oxidation reformer and/or a $NO_X$ abatement system

BACKGROUND OF THE INVENTION

It is now recognised emissions from marine vessels or ships in inland waterways and coastal areas can be a significant contribution to air quality. Marine engines can be electric engines, spark ignition engines, compression ignition engines or turbines. Ships in the context of the present invention are to include all floating objects.

In order to reduce $NO_X$ emissions of marine engines, $NO_X$ reducing exhaust gas treatment systems have been developed. These $NO_X$ reducing systems typically comprise a $NO_X$ reducing catalyst.

In U.S. Pat. No. 5,412,946 for example, a $NO_X$ reducing catalyst comprising Pt on zeolite have been described. Such a catalyst promote the reduction of $NO_X$ to nitrogen in the presence of a reducing compound. It has been described in the art to use hydrocarbons, hydrogen or synthesis gas as reducing compound for this type $NO_X$ reducing catalyst.

$NO_X$ reducing systems that comprise both a $deNO_X$ catalyst and a $NO_X$ sorbent are also known in the art. For example from U.S. Pat. No. 5,874,057, U.S. Pat. No. 5,473,887 and WO 01/34950. During lean operation, $NO_X$ is absorbed from the exhaust gas; during richer operation, the sorbent is regenerated and the catalyst promotes reduction of $NO_X$ to nitrogen. It is disclosed that the exhaust gas can periodically be made richer (less oxygen) by adding fuel, hydrogen or synthesis gas to the lean exhaust gas.

An alternative method to reduce emissions of compression ignition internal combustion engines is by means of a process known in the art as fumigation. In a fumigation process, a gaseous fuel is mixed with the intake air of the engine prior to introducing the air/gaseous fuel mixture into the engine cylinder. Both diesel fuel and the air/gaseous fuel mixture are introduced into the engine. Known gaseous fuels for fumigation are for example natural gas, liquefied petroleum gas (LPG), and hydrogen gas.

Another method for reducing emissions, especially $NO_X$, in an internal combustion engine is by exhaust gas recirculation (EGR). $NO_X$ emissions are reduced with the increase of exhaust gas recirculation. A high level of recirculation, however, can result in poor combustion. Various ways have been reported in the art by which recirculated exhaust gas may be enriched. In L. K. S Teo et al. "Hydrogen and Biodiesel Mixtures as Fuels for the Compression Ignition Engine" Proceedings of the THIESEL 2002 Conference on Thermo- and Fluid-Dynamic Processes in Diesel Engines, Birmingham, for example, the addition of hydrogen to recirculated exhaust gas has been described.

In order to ensure compliance with future limits on marine emissions there is a need to further reduce emissions, in particular the emission of nitrogen oxides.

SUMMARY OF THE INVENTION

It has now been found that, for marine engines, emissions can be further reduced by using a fuel comprising a Fischer-Tropsch derived hydrocarbon stream as engine fuel in combination with the use of synthesis gas derived from a fuel comprising Fischer-Tropsch fuel for advanced aftertreatment of the exhaust gas and/or advanced operation of the marine engine.

Accordingly, the present invention relates to a process for operating a marine engine in combination with a catalytic partial oxidation reformer and, optionally, an exhaust gas aftertreater, wherein:

(a) a mixture of a first fuel and air, is introduced in the combustion chamber of the engine;

(b) exhaust gas is discharged from the engine and optionally partly recirculated to the combustion chamber of the engine;

(c) a second fuel and oxygen and/or steam are supplied to the catalytic partial oxidation reformer to produce synthesis gas, wherein the second fuel comprises Fischer-Tropsch derived fuel;

(d) at least part of the synthesis gas is supplied to:

(i) the exhaust gas aftertreater;

(ii) the combustion chamber of the engine; or to both.

BRIEF DESCRIPTION OF THE DRAWINGS

Different embodiments of the invention are described in detail and by way of example with reference to schematic FIGS. 1 to 4.

DETAILED DESCRIPTION OF THE INVENTION

Figure 1:
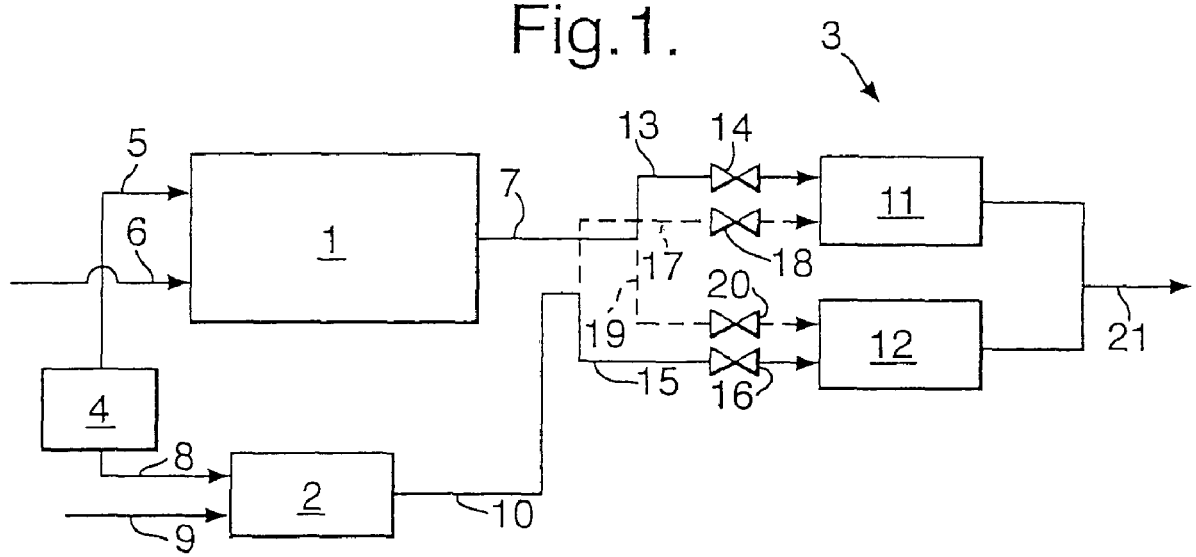
FIG. 1 shows a process according to the invention wherein synthesis gas is supplied to a $NO_X$ abatement system.

In the process according to the present invention, a marine engine is operated in combination with a catalytic partial oxidation reformer. Reference herein to a catalytic partial oxidation reformer is to a catalytic reaction zone for steam reforming, autothermal reforming or partial oxidation of a hydrocarbon fuel to form synthesis gas, i.e. a gas mixture containing hydrogen and carbon oxides. These reactions are described in more detail in the art, for example in Fuel Chemistry Division Reprints 2002, 47(2), 542.

The reformer produces synthesis gas that is used for operating the compression ignition internal combustion engine in such way that emissions are reduced.

The second fuel, i.e. the fuel for the reformer, comprise Fischer-Tropsch derived fuel. By "Fischer-Tropsch derived" is meant that the fuel is, or derives from, a synthesis product of a Fischer-Tropsch condensation process. The Fischer-Tropsch reaction converts carbon monoxide and hydrogen into longer chain, usually paraffinic, hydrocarbons:

$n(CO+2H_2)=(-CH_2-)_n+nH_2O+heat,$ in the presence of an appropriate catalyst and typically at elevated temperatures and/or pressures.

The fuel may be obtained directly from the Fischer-Tropsch reaction, or indirectly for instance by fractionation of a Fischer-Tropsch synthesis product or from a hydrotreated Fischer-Tropsch synthesis product. Hydrotreatment can involve hydrocracking to adjust the boiling range (see, e.g. GB-B-2077289 and EP-A-0147873) and/or hydroisomerisation which can improve cold flow properties by increasing the proportion of branched paraffins. EP-A-0583836 describes a two-step hydrotreatment process in which a Fischer-Tropsch synthesis product is firstly subjected to hydroconversion under conditions such that it undergoes substantially no isomerisation or hydrocracking (this hydrogenates the olefinic and oxygen-containing components), and then at least part of the resultant product is hydroconverted under conditions such that hydrocracking and isomerisation occur to yield a substantially paraffinic hydrocarbon fuel. The desired fuel fraction(s) may subsequently be isolated for instance by distillation.

Other post-synthesis treatments, such as polymerisation, alkylation, distillation, cracking-decarboxylation, isomerisation and hydroreforming, may be employed to modify the properties of Fischer-Tropsch condensation products, as described for instance in U.S. Pat. No. 4,125,566 and U.S. Pat. No. 4,478,955.

Preferably, the same fuel is used for the engine and for the reformer, i.e. the first fuel and the second fuel are the same. This has the advantage that only one fuel storage tank is needed to provide fuel to both the engine and the reformer. However it is also envisaged that the marine engine is operated using a conventional marine diesel fuel as the first fuel and the reformer is run on the preferred Fischer-Tropsch derived fuel as the second fuel.

The use of Fischer-Tropsch derived fuel in a marine engine has several advantages. These fuels are highly paraffinic and thus have a high cetane number when the engine is a compression ignition engine. Also, there fuels have a low sulphur content, thereby reducing the risk of sulphur poisoning of any catalytic system. Moreover, these fuels are inherently clean and thus result in lower emissions of particles (soot), $NO_X$, hydrocarbons and carbon monoxide. Reference is made in this respect to R. H. Clark et al. "The Environmental Benefits of Shell GTL Diesel", Proceedings of the $4^{th}$ Int. Fuels Colloquium, 15-16 Jan. 2003, Tech. Akad. Esslingen, Germany. Furthermore Fischer-Tropsch derived fuel is biodegradable and non-toxic and hence a relatively benign actor in the aquatic environment. This makes the use of said fuel in environmental sensitive areas very attractive. Examples of such areas are nature reserves, harbours and fishing grounds.

It is known, for example from WO 99/19249, that Fischer-Tropsch derived fuels are very suitable fuels for catalytic reformers. We have demonstrated that Fischer-Tropsch derived diesel and other Fischer-Tropsch derived streams are particularly suitable for reforming because they are paraffinic and sulphur-free. See for example SAE paper 2004-01-1926. An advantage of Fischer-Tropsch derived fuels over conventional internal combustion fuels in reformers is its cleanliness (no sulphur and reduced soot formation).

In order to benefit from these properties, both the first fuel and the second fuel comprise preferably at least 10% (v/v) of Fischer-Tropsch derived fuel, more preferably at least 50% (v/v), even more preferably at least 80% (v/v), still more preferably consist of substantially only Fischer-Tropsch derived fuel.

The marine engine may be a spark ignition engines, compression ignition engines or turbines. Preferably the marine engine is a marine compression ignition engine. It will be appreciated that the first fuel as such has to be suitable for compression ignition internal combustion engines. Thus, the first fuel has to meet the requirements for fuels for such engines, such as cetane number, flash point, total aromatics content, total sulphur content, as well as the specifications relating to the distillation curve and to the cold flow properties of the fuel. Therefore, the part of the first fuel or the entire first fuel that is not a Fischer-Tropsch derived fuel is preferably a diesel base fuel, such as petroleum derived gasoil, optionally in combination with oxygenates such as alcohols or fatty acid methyl esters and conventional diesel fuel additives. It has been found that less additives are needed in a fuel for a compression ignition internal combustion engine, if part of the fuel is a Fischer-Tropsch derived fuel. This implies that if the first and the second fuel are the same, the reformer is also fed with a fuel that has less additives as compared to a conventional diesel fuel. This is advantageous since some diesel additives could negatively affect the catalyst stability.

The Fischer-Tropsch derived fuel is preferably a gasoil, i.e. the fraction that is boiling in the gasoil boiling range suitably boiling substantially between 170 and 380° C. By boiling substantially in said boiling range is here meant that more than 95 vol % of the fuel boils between 170 and 380° C.

In the process according to the invention, the engine exhaust emissions are further reduced by using synthesis gas for advanced aftertreatment and/or advanced engine operation. Such further reductions may be achieved by supplying synthesis gas to an exhaust gas aftertreater, for example a $NO_X$ abatement system, and/or to the combustion chamber of the engine.

The synthesis gas is produced in a catalytic partial oxidation reformer. The reaction that takes place in the reformer may be steam reforming, partial oxidation, autothermal reforming or a combination thereof. Suitable catalysts and reaction conditions for such reformers are known in the art. The fuel is reacted with water (steam reforming), oxygen (partial oxidation) or both (autothermal reforming or partial oxidation). Preferably, the reaction is partial oxidation or autothermal reforming, since no external heat source is needed to maintain these reactions.

Air will typically be used as oxygen source for the reformer. Alternatively, exhaust gas from the engine may be used as source for oxygen and/or steam. If exhaust gas is used as steam source for the reformer, the exhaust gas may be introduced as such in the reformer or water may be condensed out of the exhaust gas before being introduced in the reformer.

In one aspect of the invention, exhaust gas of the engine (i.e. the part of the exhaust gas that is not recirculated to the combustion chamber of the engine and not fed to the reformer) is supplied to a $NO_X$ abatement system. At least part of the synthesis gas produced is also supplied to the $NO_X$ abatement system.

The $NO_X$ abatement system preferably comprises a $NO_X$ trap, which trap comprises a $NO_X$ reducing catalyst and a $NO_X$ sorbent. Such $NO_X$ traps are known in the art, for example from WO 01/34950 and U.S. Pat. No. 5,473,887. A typical example of a suitable $NO_X$ trap is the combination of platinum on an alumina support as catalyst and barium oxide as sorbent. In one embodiment of the invention, the $NO_X$ abatement system comprises a single $NO_X$ trap. The $NO_X$ trap is continuously supplied wish exhaust gas and intermittently supplied with synthesis gas. During the period that only exhaust gas is supplied to the $NO_X$ trap, $NO_X$ is absorbed on the sorbent, for example as $Ba(NO_3)_2$ if the trap comprises a BaO sorbent. During the period that exhaust gas and synthesis gas are supplied to the $NO_X$ trap, the trap is regenerated and the catalyst promotes reduction of $NO_X$ to nitrogen.

In another embodiment of the invention, the $NO_X$ abatement systems comprises two $NO_X$ traps as described hereinbefore. The two traps are operated in a so-called swing mode. One trap is supplied with exhaust gas and absorbs $NO_X$ (absorption mode) and the other trap is supplied with synthesis gas and desorps $NO_X$ that is reduced to nitrogen (regeneration mode) and vice versa. Each trap is thus alternately supplied with exhaust gas and synthesis gas. An advantage of this swing mode operation as compared to the above-described operation of a single trap is that the regeneration is performed in the absence of oxygen, resulting in a more efficient regeneration.

A specific advantage of the use of Fischer-Tropsch derived fuel in both the engine and the reformer is that the fuel contains no sulphur and thus, the exhaust gas and the synthesis gas will contain less sulphur oxides. Sulphur oxides can strongly adsorb on a $NO_X$ trap and thus have a negative effect on the performance of such trap.

In still another embodiment, the $NO_X$ abatement system, comprises a $NO_X$ reducing catalyst without a $NO_X$ sorbent. Such $NO_X$ abatement systems are known in the art. Typically, such systems comprises a platinum supported on a zeolite. Exhaust gas and synthesis gas are simultaneously supplied to the catalyst. The catalyst promotes the reduction of $NO_X$ to nitrogen; the synthesis gas acts as reducing agent.

In a second aspect of the invention, at least part of the synthesis gas is supplied to the combustion chamber of the engine. In one embodiment (fumigation), synthesis gas is supplied to the combustion chamber by mixing it with the intake air prior to introducing the air to the combustion chamber. In an alternative embodiment (enriched EGR), synthesis gas is added to recirculated exhaust gas and together they are supplied to the combustion chamber.

In the fumigation embodiment, it may be necessary to ensure that the synthesis gas concentration in the intake air stream is below the flammability limit. Further, it will be appreciated that one should take care that the overall fuel-to-air ratio is optimised—wherein fuel is defined as first fuel plus synthesis gas supplied to the combustion chamber. Preferably, the amount of synthesis gas supplied to the combustion chamber of the engine is such that the volumetric ratio of synthesis gas-to-first fuel that is supplied to the combustion chamber is at most 25%, more preferably at most 20%.

If synthesis gas and recirculated exhaust gas are together supplied to the combustion chamber (enriched EGR), the volumetric ratio of 'combined synthesis gas plus exhaust gas' to 'first fuel' supplied to the combustion chamber is preferably at most 25%. The combined synthesis gas plus exhaust gas is usually admitted to the combustion chamber through a special valve.

The introduction of part of the synthesis gas into the combustion chamber (fumigation or enriched EGR)) may be combined with synthesis gas assisted aftertreatment, such as the above-described synthesis gas assisted $NO_X$ abatement.

The invention is also directed to a method of regeneration of the marine $NO_X$ abatement system by directly by contacting the Fischer-Tropsch derived fuel with the $NO_X$ abatement system catalyst. This to either regenerate a system for $NO_X$ storage or to perform direct selective catalytic reduction. Applicants found that this method of regenerating may also find use in $NO_X$ abatement systems other than marine $NO_X$ abatement systems. Examples of such other systems are for example the systems used in automotive applications.

In the process according to the invention, at least part of the synthesis gas produced is used for advanced aftertreatment or advanced engine operation. Additionally, part of the synthesis gas may be supplied to a fuel cell for electricity generation. In this way, it is possible to provide a marine vessel with on-board electricity generation. The thus-obtained electricity may for example be applied for auxiliary power, e.g. for air conditioning, or for advanced valve control. The fuel cell can be a solid oxide fuel cell or a molten carbonate fuel cell Alternatively the syngas can be processed further to make a hydrogen rich stream suitable for a low temperature fuel cell, for example a Proton Exchange Membrane system.

In a final embodiment of the invention the electricity could be used directly to power the vessel via an electric propulsion system. The electric propulsion system is suitable present on-board the ship as auxiliary propulsion power means, for example in addition to a spark ignition engine, a compression ignition engine or a turbine engine. The quiet operation of the vessel and the benign nature of the fuel make this an ideal combination in environmentally sensitive areas.

The invention is also directed to sailing vessels provided with means to generate electricity using a fuel cell. Preferably the fuel cell is a solid oxide fuel cell or a molten carbonate fuel cell. Said fuel cell operates using synthesis gas as prepared according the above methods. Such a vessel is advantageous because, in this way, it is possible to provide a sailing vessel with on-board electricity generation, while not having to use the main propulsion engine, for example the compression ignition internal combustion marine engine. This is advantageous because the latter engine makes noises and causes vibrations on board the sailing vessel, which are not desired during sailing. The thus-obtained electricity may for example be applied for auxiliary power, e.g. for navigation equipment, refrigerators, audio equipment, hair dryers and other equipment which run on electricity and which may be found on board of, luxury, sailing yachts.

In some regatta situations sailing vessels are not allowed to use their main compression ignition internal combustion for obvious reasons. However electricity generation is then often a problem. By providing on-board a catalytic partial oxidation reformer, a fuel cell and a Fischer-Tropsch derived fuel as described above these problems are overcome. This so-called "liquid electricity" is easily stored, has a low toxicity, has a high oxidative and thermal stability and is biodegradable. The invention is thus also directed to the use of a Fischer-Tropsch derived fuel to store electricity for a prolonged time on board a marine vessel.

The invention is now illustrated by means of schematic drawings 1 to 4. Means for flow control, heat exchangers and other means for process control are not shown.

In FIG. 1 is shown a process for operating a compression ignition internal combustion engine 1 in combination with a catalytic partial oxidation reformer 2 and a $NO_X$ abatement system 3, wherein synthesis gas is supplied to $NO_X$ abatement system 3. Fuel (Fischer-Tropsch derived gascil) from fuel storage tank 4 and air are supplied to engine 1 via lines 5 and 6, respectively. The fuel is vaporised and vaporised fuel and air are mixed before being combusted in the combustion chamber (not shown) of engine 1. Exhaust gas is discharged from the engine via line 7. Catalytic partial oxidation reformer 2 comprises a catalyst bed for partial oxidation. Fuel from storage tank 4 and air are supplied to reformer 2 via lines 8 and 9, respectively. Synthesis gas is produced and discharged from reformer 2 via line 10. $NO_X$ abatement system 3 comprises two $NO_X$ traps 11, 12. $NO_X$ trap 11 is supplied with the exhaust gas from line 7 via line 13 and valve 14. $NO_X$ trap 12 is supplied with the synthesis gas from line 10 via line 15 and valve 16. When the amount of $NO_X$ absorbed on $NO_X$ trap 11 has exceeded a certain limit, trap 11 is regenerated by supplying synthesis gas to it via line 17 and valve 18. During regeneration of $NO_X$ trap 11, $NO_X$ trap 12 is supplied with exhaust gas via line 19 and valve 20 for $NO_X$ absorption. Treated exhaust gas is discharged from $NO_X$ abatement system 3 via line 21.

Figure 2:
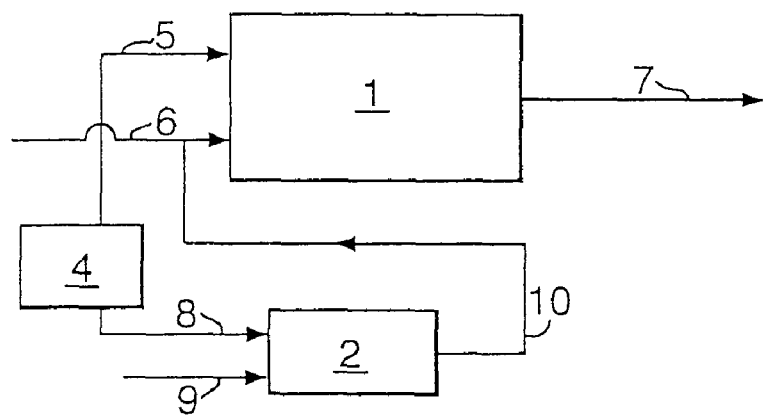
FIG. 2 shows a process according to the invention wherein synthesis gas is supplied to the combustion chamber of the engine.

In FIG. 2 is shown a process for operating a compression ignition internal combustion engine 1 in combination with a catalytic partial oxidation reformer 2, wherein synthesis gas is supplied to the combustion chamber of engine 1. The synthesis gas that is discharged from reformer 2 via line 10 is added to the intake air of engine 1.

Figure 3:
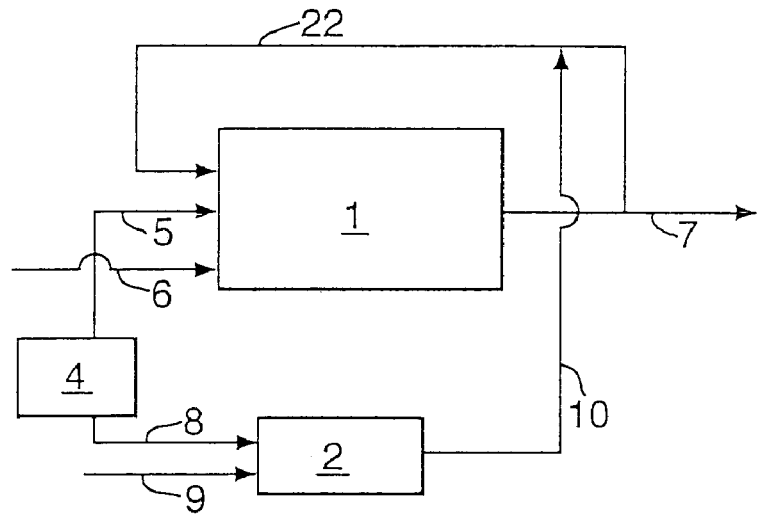
FIG. 3 shows a process according to the invention wherein synthesis gas is supplied to the combustion chamber of the engine together with recirculated exhaust gas.

In FIG. 3 is shown a process for operating a compression ignition internal combustion engine 1 in combination with a catalytic partial oxidation reformer 2, wherein synthesis gas and recirculated exhaust gas are together supplied to the combustion chamber of engine 1. A part of the exhaust gas discharged from engine 1 via line 7 is recirculated to the combustion chamber of engine 1 via line 22. The synthesis gas that is discharged from reformer 2 via line 10 is added to the recirculated exhaust gas in line 22.

Figure 4:
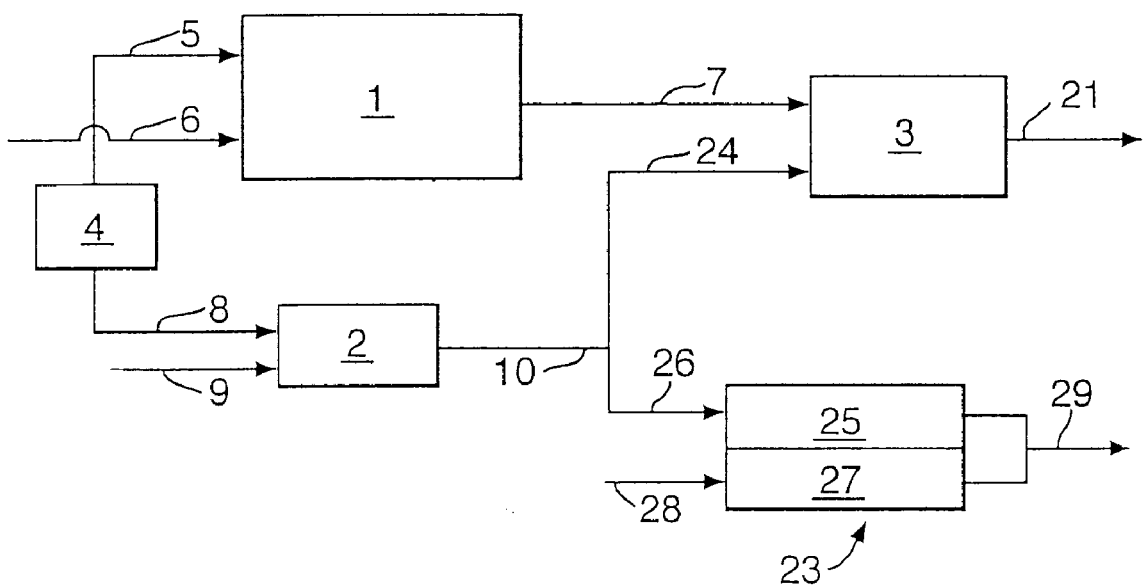
FIG. 4 shows a process according to the invention wherein synthesis gas is supplied to both a $NO_X$ abatement system and a solid oxide fuel cell.

In FIG. 4 is shown a process for operating a compression ignition internal combustion engine 1 in combination with a catalytic partial oxidation reformer 2 and a $NO_X$ abatement system 3, wherein part of the synthesis gas is supplied to $NO_X$ abatement system 3 and part of the synthesis gas is supplied to solid oxide fuel cell 23. In this embodiment, only part of the synthesis gas discharged from reformer 2 via line 10 is supplied to $NO_X$ abatement system 3 via line 24. The remainder of the synthesis gas is led to the anode 25 of fuel cell 23 via line 26. Air is led to the cathode 27 of fuel cell 23 via line 28. The anode and cathode reactions of the fuel cell are allowed to take place and electricity is generated and fuel cell off-gas is discharged from the fuel cell via line 29.

What is claimed is:

1. A process for operating a marine engine, having a combustion chamber, in combination with a catalytic partial oxidation reformer and, optionally, an exhaust gas aftertreater, comprising the step of:
    (a) introducing a mixture of a first fuel and air, in the combustion chamber of the engine;
    (b) discharging exhaust gas from the engine and optionally partly recirculating to the combustion chamber of the engine;
    (c) supplying a second fuel and oxygen and/or steam to the catalytic partial oxidation reformer to produce synthesis gas, wherein the second fuel comprises Fischer-Tropsch derived fuel;
    (d) supplying at least part of the synthesis gas to:
        (i) the exhaust gas aftertreater; or
        (ii) the combustion chamber of the engine; or to both.

2. The process of claim 1 wherein part of the synthesis gas is supplied to a fuel cell to generate electricity.

3. The process claim 1 wherein the first fuel and the second fuel are the same fuel.

4. The process of claim 1 wherein the first fuel and the second fuel comprise at least 10% (v/v) Fischer-Tropsch derived fuel.

5. The process of claim 4 wherein the first fuel and the second fuel comprise at least 50% (v/v) Fischer-Tropsch derived fuel.

6. The process of claim 4 wherein the first fuel and the second fuel comprise at least 80% (v/v) Fischer-Tropsch derived fuel.

7. The process of claim 1 wherein the marine engine is a compression ignition engine.

8. The process of claim 7 wherein the Fischer-Tropsch derived fuel is a gasoil.

9. The process of claim 7 wherein at least part of the exhaust gas is recirculated to the combustion chamber of the engine.

10. The process of claim 7 wherein at least part of the synthesis gas is supplied to the combustion chamber of the engine.

11. The process of claim 10, wherein the amount of synthesis gas supplied to the combustion chamber of engine is such that the volumetric ratio of 'synthesis gas'-to-'first fuel' supplied to the combustion chamber is at most 25%.

12. The process of claim 10 wherein the amount of synthesis gas supplied to the combustion chamber and the amount of exhaust gas recirculated to the combustion chamber is such that the volumetric ratio of 'combined synthesis gas plus exhaust gas' to 'first fuel' supplied to the combustion chamber is at most 25%.

13. The process of claim 7 which is a process for operating a compression ignition internal combustion engine in combination with a catalytic partial oxidation reformer and a $NO_X$ abatement system as exhaust gas aftertreater, wherein the non-recirculated part of the exhaust gas and at least part of the synthesis gas are supplied to the $NO_X$ abatement system.

14. The process of claim 13, wherein the $NO_X$ abatement system comprises a $NO_X$ reducing catalyst without a $NO_X$ sorbent and the non-recirculated part of the exhaust gas and the synthesis gas are simultaneously and continuously supplied to the $NO_X$ reducing catalyst.

15. The process of claim 13, wherein the $NO_X$ abatement system comprises a $NO_X$ trap comprising a $NO_X$ reducing catalyst and a $NO_X$ sorbent.

16. The process of claim 15, wherein the non-recirculated part of the exhaust gas is continuously supplied to the $NO_X$ trap and the synthesis gas is intermittently supplied to the $NO_X$ trap.

17. The process of claim 15, wherein the $NO_X$ abatement system comprises two $NO_X$ traps and wherein each trap is alternately supplied with the non-recirculated part of the exhaust gas and the synthesis gas such that one trap is supplied with the exhaust gas and the other trap with the synthesis gas.

18. A marine vessel provided with a marine compression ignition internal combustion engine, a catalytic partial oxidation reformer, an exhaust gas aftertreater, and a fuel cell for auxiliary power generation.

19. A sailing vessel provided with a catalytic partial oxidation reformer, a fuel cell and a Fischer-Tropsch derived fuel.

* * * * *